(12) United States Patent
Tian et al.

(10) Patent No.: US 12,548,202 B2
(45) Date of Patent: Feb. 10, 2026

(54) TEXTURE COORDINATE COMPRESSION USING CHART PARTITION

(71) Applicant: TENCENT AMERICA LLC, Palo Alto, CA (US)

(72) Inventors: Jun Tian, Belle Mead, NJ (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 166 days.

(21) Appl. No.: 18/490,325

(22) Filed: Oct. 19, 2023

(65) Prior Publication Data
US 2024/0185471 A1    Jun. 6, 2024

Related U.S. Application Data

(60) Provisional application No. 63/418,399, filed on Oct. 21, 2022.

(51) Int. Cl.
 *G06T 9/00* (2006.01)
(52) U.S. Cl.
 CPC ................... *G06T 9/001* (2013.01)
(58) Field of Classification Search
 CPC .............. G06T 9/001; G06T 9/004
 See application file for complete search history.

(56) References Cited

U.S. PATENT DOCUMENTS

| | | |
|---|---|---|
| 2005/0270285 A1 | 12/2005 | Zhou et al. |
| 2013/0106834 A1 | 5/2013 | Curington |
| 2015/0262444 A1* | 9/2015 | Gilligan ............. G06Q 30/0631 705/12 |
| 2020/0265611 A1* | 8/2020 | Hemmer ................. G06T 9/001 |
| 2020/0380765 A1 | 12/2020 | Thudor et al. |
| 2022/0327745 A1* | 10/2022 | Iguchi ....................... G06T 9/40 |
| 2022/0335655 A1* | 10/2022 | Jiang .................... H04N 19/172 |

FOREIGN PATENT DOCUMENTS

WO    2022/069616 A1    4/2022

OTHER PUBLICATIONS

International Search Report issued Mar. 8, 2024 in Application No. PCT/US 23/35573.
Written Opinion of the International Searching Authority issued Mar. 8, 2024 in Application No. PCT/US 23/35573.
(Continued)

*Primary Examiner* — Ming Wu
(74) *Attorney, Agent, or Firm* — Sughrue Mion, PLLC

(57) ABSTRACT

Method, apparatus, and system for mesh compression are provided. The process may include generating a texture plane associated with a mesh comprising three-dimensional coordinates using mesh parameterization. The process may include predicting, for a triangle in the texture plane, texture coordinates of a first vertex among vertices of the triangle based on an encoding status of texture coordinates of a second vertex and texture coordinates of a third vertex of the triangle. The process may further include determining a residual between the predicted texture coordinate of the first vertex and an actual texture coordinate of the first vertex; and encoding the residual using entropy coding.

20 Claims, 6 Drawing Sheets

(56) References Cited

OTHER PUBLICATIONS

Jarek Rossignac et al., "3D Compression Made Simple: Edgebreaker on a Corner-Table", College of Computing and GVU Center Georgia Institute of Technology, 7 pages.

Kun Zhou et al., "Iso-charts: Stretch-driven Mesh Parameterization using Spectral Analysis", ACM Transitions on Graphics, pp. 1-29.

European Search Report dated Dec. 5, 2025 in Application No. EP 23 88 0588.

Wenjie Zou et al: "[V-DMC] A geometry-guided attribute compression method based on Draco", 139. MPEG Meeting; Jul. 22, 2022; Online; (Motion Picture Expert Group or ISO/IEC JTC1/SC29/WG11), No. m60291 Jul. 13, 2022 (Jul. 13, 2022), XP030331981.

\* cited by examiner

TEXTURE COORDINATE COMPRESSION USING CHART PARTITION

CROSS-REFERENCE TO RELATED APPLICATION

This application claims priority from U.S. Provisional Application No. 63/418,399, filed on Oct. 21, 2022, the disclosure of which is incorporated herein by reference in its entirety.

FIELD

This disclosure is directed to a set of advanced video coding technologies. More specifically, the present disclosure is directed to methods and systems of texture coordinate prediction using chart partition in mesh compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A mesh may be composed of several polygons that describe the surface of a volumetric object. Each polygon may be defined by its vertices in 3D space and the information of how the vertices are connected, referred to as connectivity information. Such mapping is usually described by a set of parametric coordinates, referred to as XYZ coordinates. In some embodiments, vertex attributes, such as colors, normals, etc., could also be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps may be used to store high resolution attribute information such as texture, normals, displacements etc. Such information could be used for various purposes such as texture mapping and shading.

A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

SUMMARY

According to embodiments, a method, apparatus, and a non-transitory computer-readable medium stores computer instructions for a process video encoding may be provided.

According to an embodiment, the method may include using mesh parameterization to partition a mesh into a plurality of charts, each chart being associated with a local texture domain; generating a texture plane based on the plurality of charts, wherein the texture plane comprises a triangle; determining whether texture coordinates of a second vertex and a third vertex of the triangle have been coded, wherein a first vertex, the second vertex and the third vertex are different vertices of the triangle in the texture plane; predicting texture coordinates of the first vertex of the triangle based on whether the texture coordinates of the second vertex and the third vertex of the triangle have been coded; and entropy encoding a residual between the predicted texture coordinates of the first vertex and an actual texture coordinate of the first vertex.

According to an embodiment, the apparatus may include at least one memory configured to store program code; and at least one processor configured to read the program code and operate as instructed by the program code. The program code may include first partitioning code configured to cause the at least one processor to partition a mesh into a plurality of charts using mesh parameterization, each chart being associated with a local texture domain; first generating code configured to cause the at least one processor to generate a texture plane based on the plurality of charts, wherein the texture plane comprises a triangle; first determining code configured to cause the at least one processor to determine whether texture coordinates of a second vertex and a third vertex of the triangle have been coded, wherein a first vertex, the second vertex and the third vertex are different vertices of the triangle in the texture plane; first predicting code configured to cause the at least one processor to predict texture coordinates of the first vertex of the triangle based on whether the texture coordinates of the second vertex and the third vertex of the triangle have been coded; and first encoding code configured to cause the at least one processor to entropy encode a residual between the predicted texture coordinates of the first vertex and an actual texture coordinate of the first vertex.

According to an embodiment, non-transitory computer-readable medium storing instructions may include one or more instructions that, when executed by one or more processors of a device for video encoding, cause the one or more processors to using mesh parameterization, partition a mesh into a plurality of charts, each chart being associated with a local texture domain; generate a texture plane based on the plurality of charts, wherein the texture plane comprises a triangle; determine whether texture coordinates of a second vertex and a third vertex of the triangle have been coded, wherein a first vertex, the second vertex and the third vertex are different vertices of the triangle in the texture plane; predict texture coordinates of the first vertex of the triangle based on whether the texture coordinates of the second vertex and the third vertex of the triangle have been coded; and entropy encode a residual between the predicted texture coordinates of the first vertex and an actual texture coordinate of the first vertex.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

A mesh may include several polygons that describe the surface of a volumetric object. As stated above, mesh geometry information consists of vertex connectivity information, 3D coordinates, and texture coordinates, etc.

According to an aspect of the present disclosure, methods, systems, and non-transitory storage mediums for parallel processing of dynamic mesh compression are provided. Embodiments of the present disclosure may also be applied to static meshes.

Figure 1:
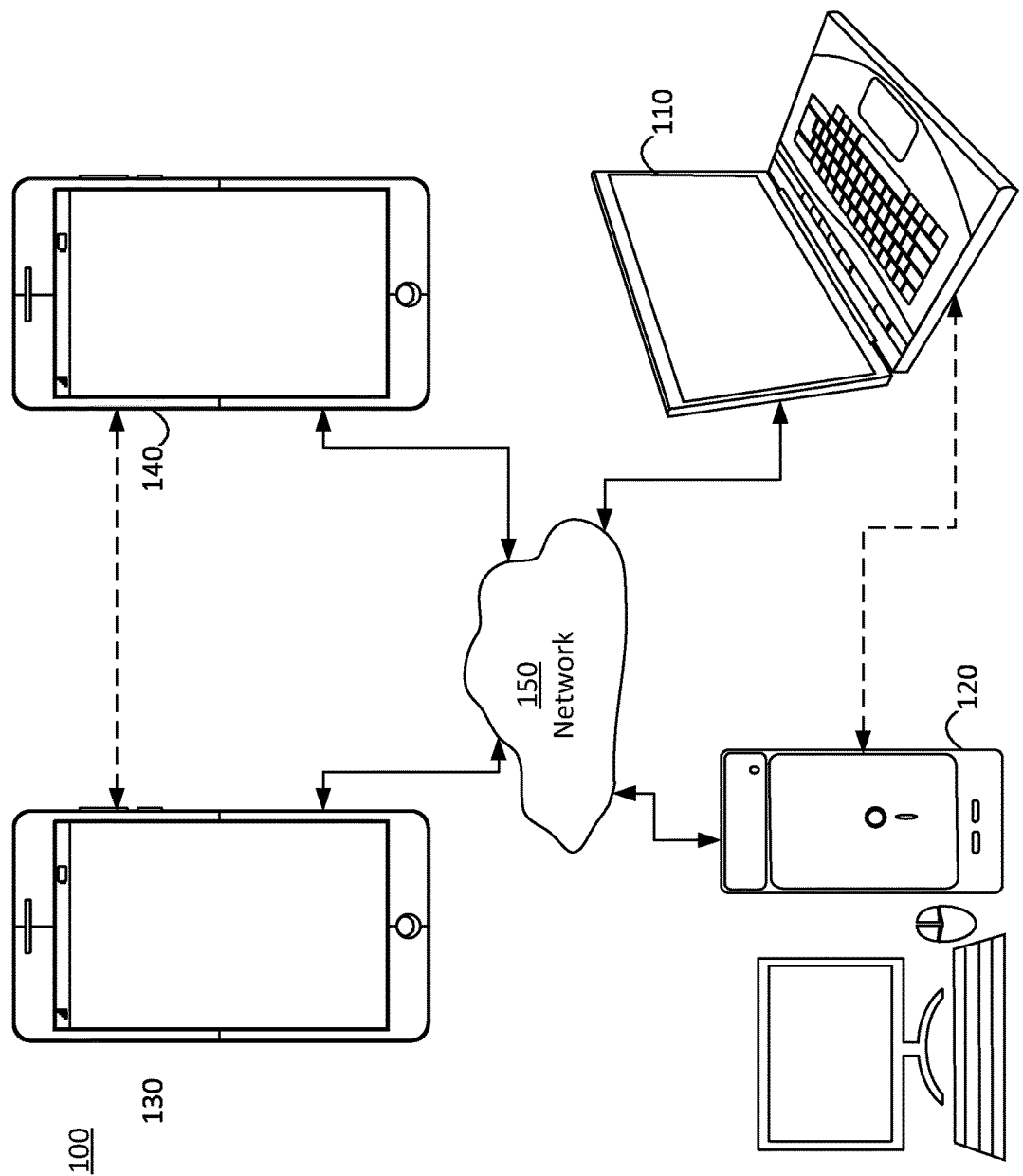
FIG. 1 is a schematic illustration of a simplified block diagram of a communication system, in accordance with embodiments of the present disclosure.
Figure 2:
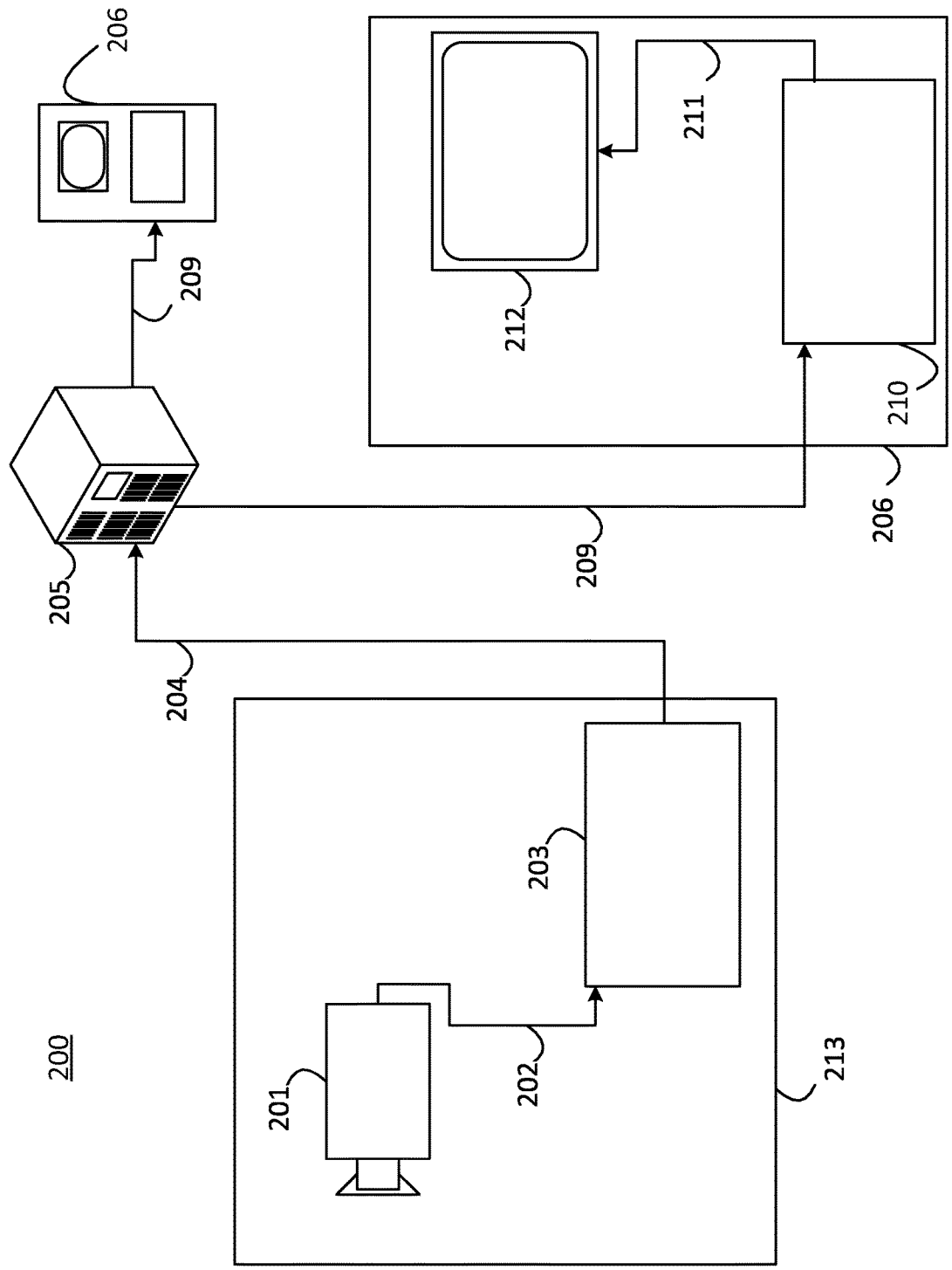
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Figure 3:
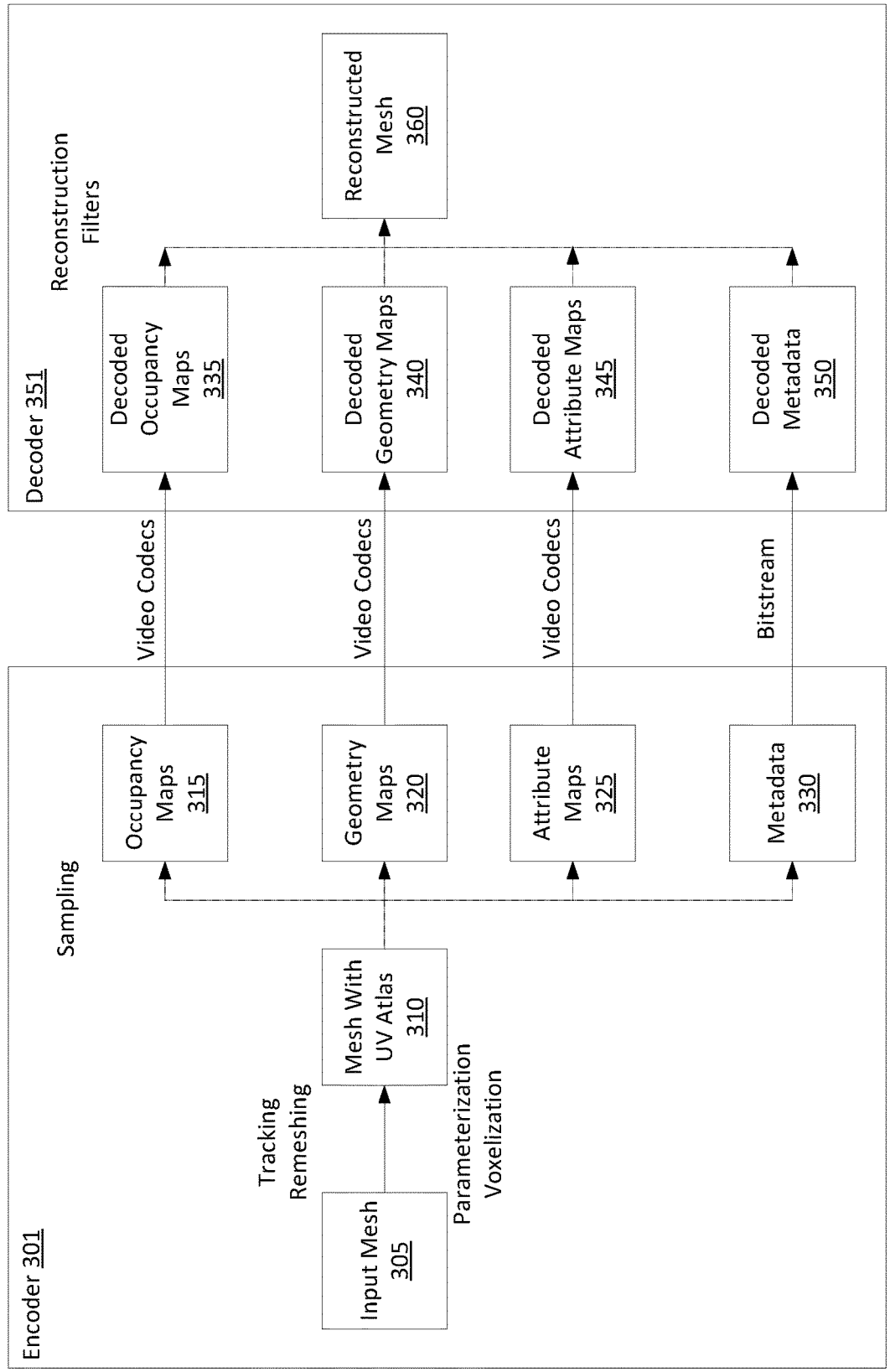
FIG. 3 is a schematic illustration of a simplified block diagram of a video encoder and decoder, in accordance with embodiments of the present disclosure.
Figure 4:
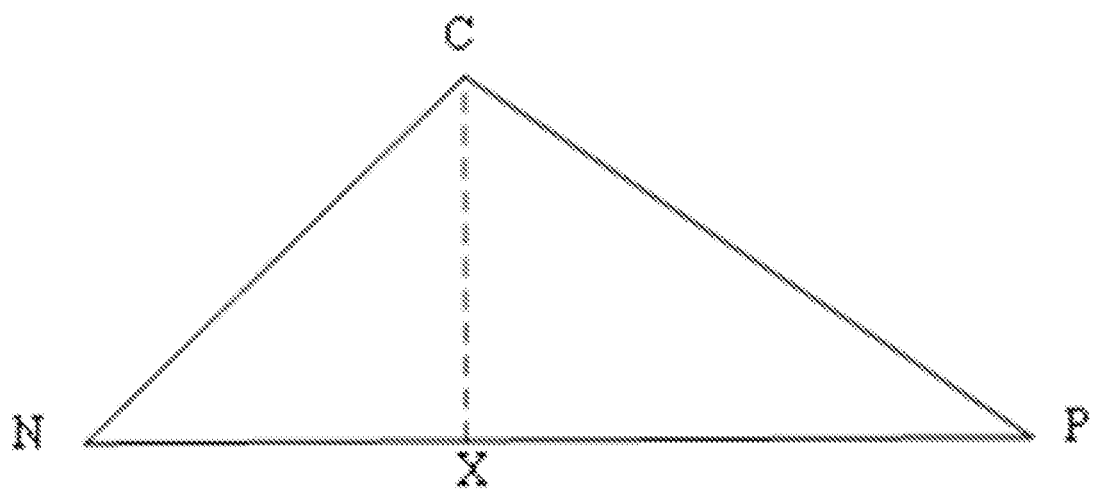
FIG. 4 is an exemplary illustration a process for vertex position compression, in accordance with embodiments of the present disclosure.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to an aspect of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side. Mesh parameterization may be a process of mapping textures to the surfaces of 2D and 3D meshes.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The generated occupancy maps 335, geometry maps 340, and attribute maps 345 may be encoded using appropriate codecs (e.g., HVEC, VVC, AV1, etc.) and transmitted to a decoder. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 351 may use appropriate techniques and methods, in addition to embodiments described herein, to decode the occupancy maps, geometry maps, and attribute maps. In an embodiment, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

The input meshes with 2D UV atlases may have vertices, where each vertex of the mesh may have an associated UV coordinates on the 2D atlas. The occupancy, geometry, and attribute maps may be generated by sampling one or more points/positions on the UV atlas. Each sample position, if it is inside a polygon defined by the mesh vertices, may be occupied or unoccupied. For each occupied sample, one can calculate its corresponding 3D geometry coordinates and attributes by interpolating from the associated polygon vertices.

According to an aspect of the present disclosure, the sampling rate may be consistent over the whole 2D atlas. In some embodiments, the sampling rate for u and v axes may be different, making anisotropic remeshing possible. In some embodiments, the whole 2D atlas may be divided into multiple regions, such as slices or tiles, and each such region may have a different sampling rate.

According to an aspect of the present disclosure, the sampling rate for each region (or the entire 2D atlas) may be signaled in a high-level syntax, including but not limited to sequence header, frame header, slice header, etc. In some embodiments, sampling rate for each region (or the entire 2D atlas) may be chosen from a pre-established set of rates that have been assumed by both the encoder and decoder. Because the pre-established set of rates that are known by both the encoder and decoder, signaling of one particular sampling rate would require only signaling the index in the pre-established rate set. An example of such a pre-established set may be every 2 pixels, every 4 pixels, every 8 pixels, etc. In some embodiments, the sampling rate for each region (or the entire 2D atlas) of a mesh frame may be predicted from a pre-established rate set, from a previously used sampling rate in other already coded regions of the same frame, or from a previously used sampling rate in other already coded mesh frames.

In some embodiments, the sampling rate for each region (or the entire 2D atlas) may be based on some characteristic of each region (or the entire 2D atlas). As an example, the sample rate can be based on activity—for a rich-textured region (or the entire 2D atlas), or a region (or the entire 2D atlas) with high activity, the sample rate could be set higher. As another example, for a smooth region (or the entire 2D atlas), or a region (or the entire 2D atlas with low activity, the sample rate could be set lower.

In some embodiments, the sampling rate for each region (or the entire 2D atlas) of a mesh frame may be signaled in a way that combination of prediction and direct signaling may be allowed. The syntax may be structured to indicate if a sampling rate will be predicted or directly signaled. When predicted, which of the predictor-sampling rate to be used may be further signaled. When directly signaled, the syntax to represent the value of the rate may be signaled.

In the present disclosure, exemplary polygons such as triangle meshes are considered in more detail. A triangle mesh is a type of polygon mesh, comprising a set of triangles that are connected by their common edges or corners. Methods disclosed in this disclosure may be extended to other polygonal meshes such as quadrilateral or pentagon meshes, etc.

In related art, similarity of triangles from 3D coordinates to texture coordinates is employed by Draco method to compress texture coordinates. Assuming, points C, N, and P are three vertices of a triangle in the texture plane (e.g., 2D plane), where C is the next vertex to be encoded.

The Draco method texture coordinate compression may include:

Step 1: If either N or P is after C in the encoding order list, compress the texture coordinate of C with the delta coding.

Step 2: If the coding orders of both N and P are before C, use the prediction coding method to encode C: CX is perpendicular to NP. Calculate X and $\overrightarrow{XC}$, and then get two candidate values, i.e., $X+\overrightarrow{XC}$, $X-\overrightarrow{XC}$, as the potential predicted coordinates.

Step 3: Calculate the Euclidean distances between C and the two candidates, and choose the smaller one as the predicted coordinate of C. A flag will be used to mark which one is the predicted coordinate.

Step 4: Calculate the residual between the original coordinate and the predicted coordinate. Compress the residual and flag by using the entropy coding.

The proposed embodiments may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In this disclosure, a number of methods and systems are proposed for texture coordinate prediction in mesh compression. Note that they can be applied individually or by any form of combinations. It should be also noted that the methods can be applied to not only dynamic meshes, but also static meshes, where there is only one frame of the mesh, or the mesh content does not change over time.

Chart Partition

Mesh parameterization is the process of a one-to-one and onto mapping between two surfaces, e.g., 2D mesh surfaces or 3D mesh surfaces. For a mesh, given the position values of 3D vertices along with the connectivity information, a mesh parameterization algorithm can generate a texture atlas. A texture atlas is a non-overlapping map of a 2D texture that may be mapped onto the mesh. In this disclosure, we will use one mesh parameterization algorithm called iso-charts to illustrate our methods. Iso-chart based mesh parameterization includes performing an initial parameterization. Then, stretch optimization may be performed in one or more iterations to reduce the distortion of the mesh. Then, spectral clustering may be performed to partition the surface into charts, which are recursively split until a predetermined stretch criteria is met. The disclosed methods can be applied to other mesh parameterization algorithms as well.

In iso-charts, a mesh is partitioned into charts. Each chart is parameterized into a local texture domain. A local texture domain is mapping the texture of the charts generated using iso-charts. Then all charts are packed into a single texture plane to form the texture atlas. a texture plane is a flat and/or planar representation of the charts in two dimensions.

In the present disclosure, methods and systems are disclosed that enable texture coordinate compression based on chart partition.

Texture Coordinate Prediction

For a mesh, after both position values of 3D vertices and connectivity information are coded, we employ the chart partition to reconstructed position values and connectivity information. The chart partition can be based on iso-charts or other mesh parameterization algorithms. After the chart partition, charts with parameterized local texture domain are generated. For example, the disclosed method can use mesh parameterization to partition a mesh into a plurality of charts, each chart being associated with a local texture domain. Then, the disclosed method can generate a texture plane based on the plurality of charts, wherein the texture plane comprises a triangle. Furthermore, the disclosed method determines whether texture coordinates of a second vertex and a third vertex of the triangle have been coded. Here, the first vertex, the second vertex and the third vertex are different vertices of the triangle in the same texture plane. Next, the disclosed method can predict texture coordinates of a first vertex of the triangle based on whether the texture coordinates of the second vertex and the third vertex of the triangle have been coded. If at least one of the texture coordinates of the second vertex and the third vertex of the triangle has not been coded, the disclosed method can compress the texture coordinate of the first vertex via delta coding. If both texture coordinates of the second vertex and the third vertex of the triangle have been coded, the disclosed method predict the texture coordinate of the first vertex based on a determination of whether the first vertex, the second vertex and the third vertex are associated with the same local texture domain. Next, the disclosed method performs entropy encoding of a residual between the predicted texture coordinate of the first vertex and an actual texture coordinate of the first vertex.

Figure 5:
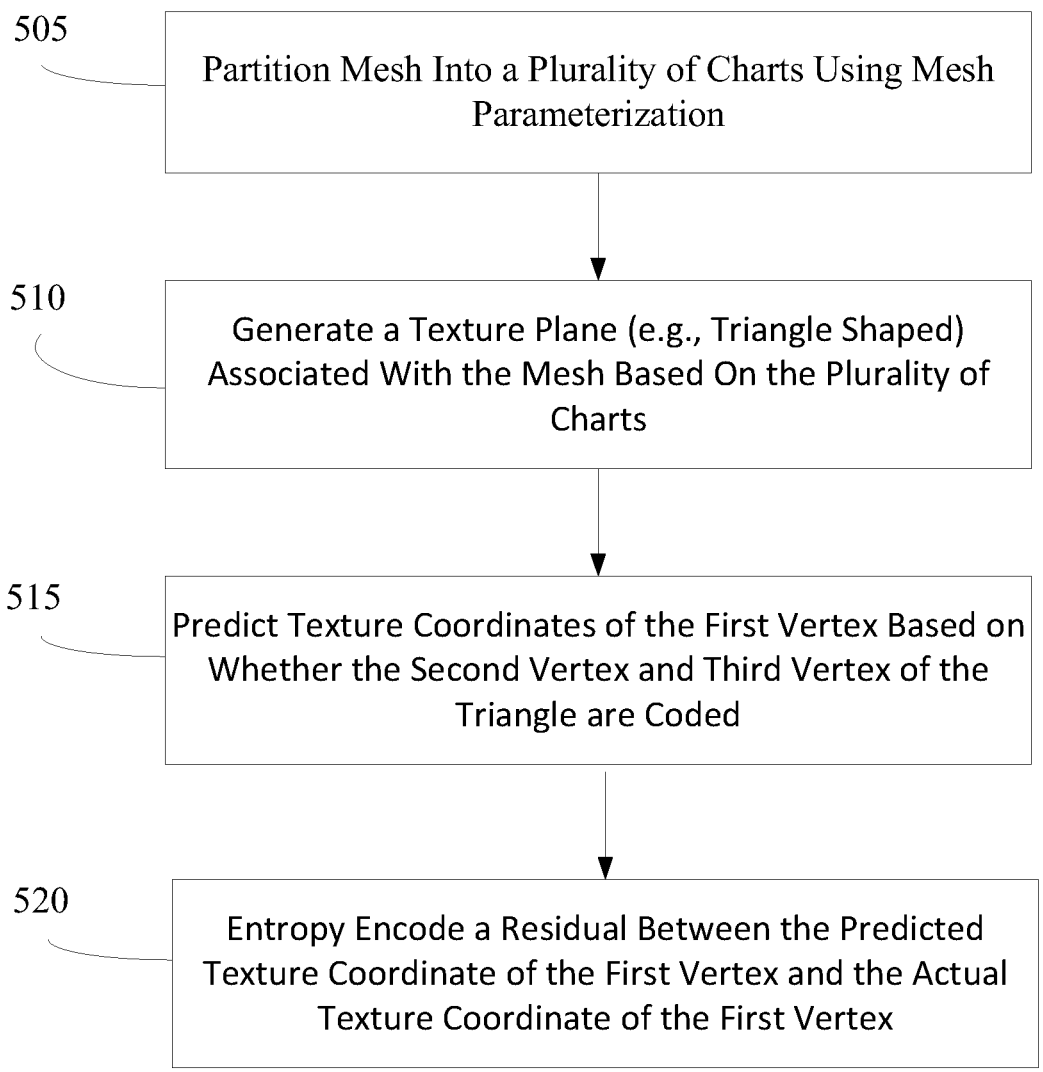
FIG. 5 is an exemplary flow diagram illustrating a process for video encoding, in accordance with embodiments of the present disclosure.

FIG. 5 illustrates a more detailed example of the above-described method. As in FIG. 5, C, N, and P are three vertices of a triangle in the texture plane, where C is the next vertex to be encoded. Texture coordinate compression, according to embodiments, may work as follows:

If either N or P has not been coded, the texture coordinate of C may be compressed with the delta coding.

If both N and P have been coded, check if N, and P, and C are vertices of a triangle in a local texture domain.

If N, P, and C are vertices of a triangle in a local texture domain, assume the local coordinates of N, P, and C are $N_{local}$, $P_{local}$, and $C_{local}$, respectively. In the local texture domain, draw a perpendicular line from $C_{local}$ to the edge $N_{local}P_{local}$, and assume the intersection point is $X_{local}$. Using $X_{local}$, $N_{local}$, $P_{local}$, and $C_{local}$ to identify a point X in the texture plane, where X in on the edge NP, or the extended line of NP, and it keeps the ratio between the length |NX| and |XP| in the local texture domain, that is, |NX|/|XP|= /|$X_{local}P_{local}$|. In the texture plane, from the point X, draw a perpendicular line to the edge NP, and select a point C' on the perpendicular line, such that the length |CX|/ |NP|=|$C_{local}X_{local}$|/|$N_{local}P_{local}$|. Then C' may be used as the prediction of C for texture coordinate.

In the same or another embodiments, if N, P, and C do not belong to the same triangle in any local texture domain, then apply the Draco method to predict the texture coordinate of C.

The process may include, calculating the residual between the original coordinate and the predicted coordinate. Compress the residual by using the entropy coding.

Alternatively, an embodiment may include choosing the texture prediction from the local texture domain or the Draco method. The texture coordinate compression works as follows:

If either N or P has not been coded, the texture coordinate of C may be compressed with the delta coding.

If both N and P have been coded, check if N, and P, and C are vertices of a triangle in a local texture domain.

If N, P, and C are vertices of a triangle in a local texture domain, estimate the coding cost of texture coordinate prediction using the local texture domain and the coding cost of texture coordinate prediction using Draco, and signal the one with the smaller coding cost. Then, apply the texture coordinate prediction with the smaller coding cost.

If N, P, and C do not belong to the same triangle in any local texture domain, then apply the Draco method to predict the texture coordinate of C.

The process may include calculating the residual between the original coordinate and the predicted coordinate. Compress the residual and flag by using the entropy coding.

Texture Coordinate Compression for Pre-Processing Mesh

In embodiments, pre-processing may be applied to a mesh to improve the mesh compression efficiency. For a mesh that is pre-processed by iso-chart, the texture coordinate compression may work as follows:

If either N or P has not been coded, the texture coordinate of C may be compressed with the delta coding.

If both N and P have been coded, C may be reconstructed from the local texture domain, and therefore C may not be coded.

A person of skill in the art will know that the proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In the present disclosure, methods and systems are proposed for texture coordinate prediction in mesh compression. A person of skill in the art will know that they can be applied individually or by any form of combinations. It should be also noted that the methods can be applied to not only dynamic meshes, but also static meshes, where there is only one frame of the mesh, or the mesh content does not change over time. Further, the disclosed methods and systems are not limited to texture coordinate compression. They can also be applied to, for example, 3D coordinate compression.

As stated above, the present disclosure uses triangle meshes for describing the disclosure in detail but a person of skill in the art will know that mesh polygons of any shape may be used.

FIG. 5 is a flow diagram illustrating a process 500 for mesh compression.

At operation 505, a mesh may be partitioned into a plurality of charts using mesh parameterization. In embodiments, each chart being associated with a local texture domain.

At operation 510, a texture plane associated with a mesh may be generated based on the plurality of charts. The texture plane may be shaped as a triangle in an exemplary embodiment. In embodiments, the texture plane may be in a shape other than a triangle.

In an embodiment, generating the texture plane may include receiving, for the mesh, three-dimensional (3D) coordinates for a plurality of vertices and connectivity information associated with the 3D coordinates; partitioning the received mesh into more than one chart; generating respective texture domains for the more than one chart based on the 3D coordinates and the connectivity information; and generating the texture plane by combining the respective texture domains.

At operation 515, for a triangle in the texture plane, whether texture coordinates of a second vertex and a third vertex of the triangle have been coded may be determined, with the first vertex, the second vertex and the third vertex being different vertices of the triangle in the texture plane.

In embodiments, operation 515 may also include predicting texture coordinates of a first vertex among vertices of the triangle based on whether the texture coordinates of the second vertex and the third vertex of the triangle have been coded.

In embodiments, the prediction may include based on determining that the texture coordinates of the second vertex and the texture coordinates of the third vertex of the triangle in the texture plane are already encoded, determining whether the first vertex, the second vertex, the third vertex are vertices of a same triangle in a local texture domain; based on determining that the first vertex, the second vertex, and the third vertex are vertices of the same triangle in the local texture domain, determining, a local intersection point on a line extending between a second local vertex and a third local vertex using a first perpendicular line from a first local vertex to the line extending between the second local vertex and the third local vertex, wherein the local intersection point divides the line extending between the second local vertex and the third local vertex in a first ratio, and wherein the first local vertex, the second local vertex, and the third local vertex are points in the local texture domain corresponding to the first vertex, the second vertex, and the third vertex in the texture plane; determining an intersection point in the texture plane corresponding to the local intersection point, wherein the intersection point divides a line extending between the second vertex and the third vertex in the first ratio; determining, in the texture plane, a first point that is located on a second perpendicular line from the intersection point to the line extending between the second vertex and the third vertex; and predicting the texture coordinates of the first vertex based on a position of the first point in the texture plane.

In some embodiments, each texture domain among the respective texture domains is of a triangle shape.

In some embodiment, based on determining that the first vertex, the second vertex, and the third vertex are not vertices of the same triangle in the local texture domain, the texture coordinates of the first vertex may be encoded using draco coding.

In some embodiments, based on determining that at least one of the second vertex and the third vertex of the triangle in the texture plane are not encoded, the texture coordinates of the first vertex may be encoded using delta coding.

At operation 520, the determined residual between the predicted texture coordinates of the first vertex and an actual texture coordinate of the first vertex may be encoded using entropy coding.

In embodiments, connectivity information may include coordinate information, edge information, shape information, texture information, etc., associated with the mesh. In embodiments, meshes may be divided into more than one charts. In some embodiments, the one or more charts may be iso-charts. Iso-charts may include charts generated using iso-maps or any techniques known to a person skilled in the art.

In embodiments, texture plane may include a two-dimensional (2D) representation of the volumetric object represented in the mesh, and texture coordinates may include the 2D coordinates of vertices in the texture plane. In embodiments, texture domains may include 2D representations of the one or more charts.

The techniques, described above, can be implemented as computer software using computer-readable instructions and physically stored in one or more computer-readable media. For example, FIG. 6 shows a computer system 600 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
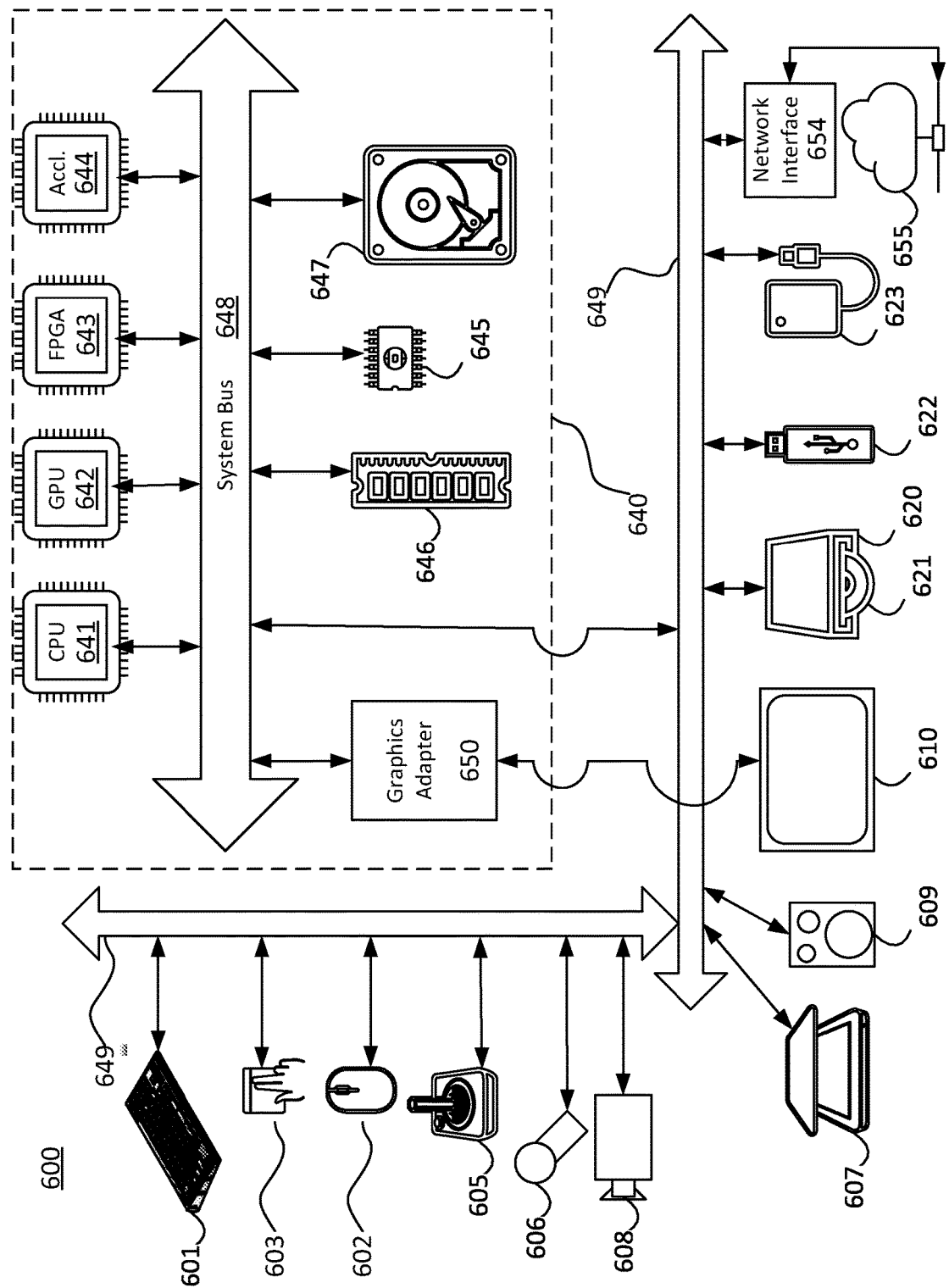
FIG. 6 is a diagram of a computer system suitable for implementing embodiments.

The components shown in FIG. 6 for computer system 600 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data glove, or joystick 605, but there can also be tactile feedback devices that do not serve as input devices). For example, such devices may be audio output devices (such as: speakers 609, headphones (not depicted)), visual output devices (such as screens 610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 649 (such as, for example USB ports of the computer system 600; others are commonly integrated into the core of the computer system 600 by attachment to a system bus as described below (for example Ethernet interface into a PC computer system or cellular network interface into a smartphone computer system). Using any of these networks, computer system 600 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 655. Certain protocols and protocol stacks can be used on each of those networks and network interfaces as described above.

Aforementioned human interface devices, human-accessible storage devices, and network interfaces 654 can be attached to a core 640 of the computer system 600.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory 646, internal mass storage such as internal non-user accessible hard drives, SSDs, and the like 647, may be connected through a system bus 648. In some computer systems, the system bus 648 can be accessible in the form of one or more physical plugs to enable extensions by additional CPUs, GPU, and the like. The peripheral devices can be attached either directly to the core's system bus 648, or through a peripheral bus 649. Architectures for a peripheral bus include PCI, USB, and the like. A graphics adapter 650 may be included in the core 640.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 600, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh compression, the method being executed by at least one processor, the method comprising:

using mesh parameterization to partition a mesh into a plurality of charts, each chart being associated with a local texture domain;
generating a texture plane based on the plurality of charts, wherein the texture plane comprises a triangle;
determining whether texture coordinates of a second vertex of the triangle and a third vertex of the triangle have been coded, wherein a first vertex of the triangle, the second vertex and the third vertex are different vertices of the triangle in the texture plane;
predicting texture coordinates of the first vertex of the triangle based on whether the texture coordinates of the second vertex and the third vertex of the triangle have been coded; and
entropy encoding a residual between the predicted texture coordinates of the first vertex and an actual texture coordinate of the first vertex.

2. The method of claim 1, wherein predicting the texture coordinates of the first vertex comprises:
based on determining that the texture coordinates of the second vertex and the texture coordinates of the third vertex of the triangle in the texture plane are already coded, determining whether the first vertex, the second vertex, the third vertex are vertices of a same triangle in a local texture domain;
based on determining that the first vertex, the second vertex, and the third vertex are vertices of the same triangle in the local texture domain, determining, a local intersection point on a line extending between a second local vertex and a third local vertex using a first perpendicular line from a first local vertex to the line extending between the second local vertex and the third local vertex,
wherein the local intersection point divides the line extending between the second local vertex and the third local vertex in a first ratio, and
wherein the first local vertex, the second local vertex, and the third local vertex are points in the local texture domain corresponding to the first vertex, the second vertex, and the third vertex in the texture plane;
determining an intersection point in the texture plane corresponding to the local intersection point,
wherein the intersection point divides a line extending between the second vertex and the third vertex in the first ratio;
determining, in the texture plane, a first point that is located on a second perpendicular line from the intersection point to the line extending between the second vertex and the third vertex; and
predicting the texture coordinates of the first vertex based on a position of the first point in the texture plane.

3. The method of claim 2, wherein the method comprises:
based on determining that the first vertex, the second vertex, and the third vertex are not vertices of the same triangle in the local texture domain, encoding the texture coordinates of the first vertex using draco coding.

4. The method of claim 1, wherein predicting the texture coordinates of the first vertex comprises:
based on determining that at least one of the second vertex and the third vertex of the triangle in the texture plane are not coded, encoding the texture coordinates of the first vertex using delta coding.

5. The method of claim 1, wherein generating the texture plane comprises:
receiving, for the mesh, three-dimensional (3D) coordinates for a plurality of vertices and connectivity information associated with the 3D coordinates;
partitioning the received mesh into more than one chart;
generating respective local texture domains for the more than one chart based on the 3D coordinates and the connectivity information; and
generating the texture plane by combining the respective local texture domains.

6. The method of claim 5, wherein the more than one chart may be iso-charts.

7. The method of claim 5, wherein each local texture domain among the respective local texture domains is of a triangle shape.

8. An apparatus for mesh compression, the apparatus comprising:
at least one memory configured to store program code; and
at least one processor configured to read the program code and operate as instructed by the program code, the program code including:
first partitioning code configured to cause the at least one processor to partition a mesh into a plurality of charts using mesh parameterization, each chart being associated with a local texture domain;
first generating code configured to cause the at least one processor to generate a texture plane based on the plurality of charts, wherein the texture plane comprises a triangle;
first determining code configured to cause the at least one processor to determine whether texture coordinates of a second vertex of the triangle and a third vertex of the triangle have been coded, wherein a first vertex of the triangle, the second vertex and the third vertex are different vertices of the triangle in the texture plane;
first predicting code configured to cause the at least one processor to predict texture coordinates of the first vertex of the triangle based on whether the texture coordinates of the second vertex and the third vertex of the triangle have been coded; and
first encoding code configured to cause the at least one processor to entropy encode a residual between the predicted texture coordinates of the first vertex and an actual texture coordinate of the first vertex.

9. The apparatus of claim 8, wherein the first predicting code comprises:
second determining code configured to cause the at least one processor to, based on determining that the texture coordinates of the second vertex and the texture coordinates of the third vertex of the triangle in the texture plane are already encoded, determine whether the first vertex, the second vertex, the third vertex are vertices of a same triangle in a local texture domain;
third determining code configured to cause the at least one processor to, based on determining that the first vertex, the second vertex, and the third vertex are vertices of the same triangle in the local texture domain, determine, a local intersection point on a line extending between a second local vertex and a third local vertex using a first perpendicular line from a first local vertex to the line extending between the second local vertex and the third local vertex,
wherein the local intersection point divides the line extending between the second local vertex and the third local vertex in a first ratio, and wherein the first local vertex, the second local vertex, and the third local vertex are points in the local texture domain corresponding to the first vertex, the second vertex, and the third vertex in the texture plane;

forth determining code configured to cause the at least one processor to determine an intersection point in the texture plane corresponding to the local intersection point,
wherein the intersection point divides a line extending between the second vertex and the third vertex in the first ratio;

fifth determining code configured to cause the at least one processor to determine, in the texture plane, a first point that is located on a second perpendicular line from the intersection point to the line extending between the second vertex and the third vertex; and second predicting code configured to cause the at least one processor to predict the texture coordinates of the first vertex based on a position of the first point in the texture plane.

10. The apparatus of claim 9, wherein the program code further comprises:
sixth encoding code configured to cause the at least one processor to, based on determining that the first vertex, the second vertex, and the third vertex are not vertices of the same triangle in the local texture domain, encode the texture coordinates of the first vertex using draco coding.

11. The apparatus of claim 8, wherein the first predicting code comprises:
third encoding code configured to cause the at least one processor to, based on determining that at least one of the second vertex and the third vertex of the triangle in the texture plane are not encoded, encode the texture coordinates of the first vertex using delta coding.

12. The apparatus of claim 8, wherein the first generating code comprises:
first receiving code configured to cause the at least one processor to receive, for the mesh, three-dimensional (3D) coordinates for a plurality of vertices and connectivity information associated with the 3D coordinates;
second partitioning code configured to cause the at least one processor to partition the received mesh into more than one chart;
seventh generating code configured to cause the at least one processor to generate respective texture domains for the more than one chart based on the 3D coordinates and the connectivity information; and
eight generating code configured to cause the at least one processor to generate the texture plane by combining the respective texture domains.

13. The apparatus of claim 12, wherein the more than one chart may be iso-charts.

14. The apparatus of claim 12, wherein each texture domain among the respective texture domains is of a triangle shape.

15. A non-transitory computer-readable medium storing instructions, the instructions comprising: one or more instructions that, when executed by one or more processors of a device for mesh compression, cause the one or more processors to:
using mesh parameterization, partition a mesh into a plurality of charts, each chart being associated with a local texture domain;
generate a texture plane based on the plurality of charts, wherein the texture plane comprises a triangle;
determine whether texture coordinates of a second vertex of the triangle and a third vertex of the triangle have been coded, wherein a first vertex of the triangle, the second vertex and the third vertex are different vertices of the triangle in the texture plane;
predict texture coordinates of the first vertex of the triangle based on whether the texture coordinates of the second vertex and the third vertex of the triangle have been coded; and
entropy encode a residual between the predicted texture coordinates of the first vertex and an actual texture coordinate of the first vertex.

16. The non-transitory computer-readable medium of claim 15, predicting the texture coordinates of the first vertex comprises:
based on determining that the texture coordinates of the second vertex and the texture coordinates of the third vertex of the triangle in the texture plane are already encoded, determine whether the first vertex, the second vertex, the third vertex are vertices of a same triangle in a local texture domain;
based on determining that the first vertex, the second vertex, and the third vertex are vertices of the same triangle in the local texture domain, determine, a local intersection point on a line extending between a second local vertex and a third local vertex using a first perpendicular line from a first local vertex to the line extending between the second local vertex and the third local vertex,
wherein the local intersection point divides the line extending between the second local vertex and the third local vertex in a first ratio, and
wherein the first local vertex, the second local vertex, and the third local vertex are points in the local texture domain corresponding to the first vertex, the second vertex, and the third vertex in the texture plane;
determine an intersection point in the texture plane corresponding to the local intersection point,
wherein the intersection point divides a line extending between the second vertex and the third vertex in the first ratio;
determine, in the texture plane, a first point that is located on a second perpendicular line from the intersection point to the line extending between the second vertex and the third vertex; and
predict the texture coordinates of the first vertex based on a position of the first point in the texture plane.

17. The non-transitory computer-readable medium of claim 16, further comprising instructions that cause the one or more processors to:
based on determining that the first vertex, the second vertex, and the third vertex are not vertices of the same triangle in the local texture domain, encode the texture coordinates of the first vertex using draco coding.

18. The non-transitory computer-readable medium of claim 15, wherein predicting the texture coordinates of the first vertex comprises:
based on determining that at least one of the second vertex and the third vertex of the triangle in the texture plane are not encoded, encoding the texture coordinates of the first vertex using delta coding.

19. The non-transitory computer-readable medium of claim 15, wherein generating the texture plane comprises:

receiving, for the mesh, three-dimensional (3D) coordinates for a plurality of vertices and connectivity information associated with the 3D coordinates;

partitioning the received mesh into more than one chart;

generating respective texture domains for the more than one chart based on the 3D coordinates and the connectivity information; and generating the texture plane by combining the respective texture domains.

20. The non-transitory computer-readable medium of claim 15, wherein the more than one chart may be iso-charts.

* * * * *